United States Patent
Auner et al.

(10) Patent No.: US 9,428,618 B2
(45) Date of Patent: Aug. 30, 2016

(54) METHOD FOR PRODUCING HALOGENATED OLIGOMERS AND/OR HALOGENATED POLYMERS OF ELEMENTS OF THE THIRD TO FIFTH MAIN GROUP

(75) Inventors: Norbert Auner, Glashütten (DE); Sven Holl, Gückigen (DE); Christian Bauch, Bitterfeld-Wolfen (DE); Gerd Lippold, Leipzig (DE); Rumen Deltschew, Leipzig (DE); Thoralf Gebel, Dresden (DE); Javad Mohsseni, Bitterfeld-Wolfen (DE)

(73) Assignee: SPAWNT PRIVATE S.A.R.L., Luxembourg (LU)

( * ) Notice: Subject to any disclaimer, the term of this patent is extended or adjusted under 35 U.S.C. 154(b) by 1012 days.

(21) Appl. No.: 13/119,509

(22) PCT Filed: Sep. 15, 2009

(86) PCT No.: PCT/DE2009/001299
§ 371 (c)(1),
(2), (4) Date: Aug. 30, 2011

(87) PCT Pub. No.: WO2010/031390
PCT Pub. Date: Mar. 25, 2010

(65) Prior Publication Data
US 2011/0305620 A1    Dec. 15, 2011

(30) Foreign Application Priority Data

Sep. 17, 2008   (DE) .......... 10 2008 047 739
Sep. 18, 2008   (DE) .......... 10 2008 047 940

(51) Int. Cl.
*C08G 77/60*   (2006.01)
*C08G 77/50*   (2006.01)

(52) U.S. Cl.
CPC ............. *C08G 77/60* (2013.01); *C08G 77/50* (2013.01)

(58) Field of Classification Search
CPC ............... C08G 77/50; C08G 77/60
USPC .................. 423/341, 342; 204/164
See application file for complete search history.

(56) References Cited

U.S. PATENT DOCUMENTS

| | | |
|---|---|---|
| 5,202,405 A | 4/1993 | Michalczyk |
| 2009/0127093 A1 | 5/2009 | Auner |
| 2009/0169457 A1 | 7/2009 | Auner et al. |
| 2010/0080746 A1 | 4/2010 | Lang et al. |
| 2010/0155219 A1 | 6/2010 | Auner et al. |

FOREIGN PATENT DOCUMENTS

| | | |
|---|---|---|
| DE | 102005024041 | 11/2006 |
| DE | 102007007874 | 8/2008 |
| DE | 102007013219 | 9/2008 |
| EP | 0282037 A2 | 9/1988 |
| JP | 10-139413 A | 5/1998 |
| WO | 2007084819 A2 | 7/2007 |
| WO | WO2008/002109 | 1/2008 |
| WO | WO 2008/009473 | 1/2008 |

OTHER PUBLICATIONS

Preliminary Report on Patentability dated Jul. 2009.
Andrejew D.N, Synthese siliziumorgnischer Verbindungen durch elektrische Glimmentladungen, *Journal fur praktische Chemie*, 4, Reihe, Band 23, 1964.
Plasmatechnik, Gundlagen und anwendungen-ein Einfuhrung, Autorenkollektiv, pp. 50-57 pp. 382-396, Carl Hanser Verlag, Munchen/Wien, 1984.
Glimmentladung, www.wikipedia.de, Jan. 24, 2010.
Haberle et al., Journal of Organometallic Chemistry, 312 (1986) 155-165.
International Search Report dated Feb. 23, 2010.

*Primary Examiner* — Yevegeny Valenrod
(74) *Attorney, Agent, or Firm* — Enshan Hong; VLP Law Group LLP

(57) ABSTRACT

The invention relates to a method for producing halogenated oligomers and/or halogenated polymers of elements of the third to fifth main group, wherein the halogenated oligomers and/or halogenated polymers are synthesized from a first chain-forming agent and a second chain-forming agent in a plasma-chemical reaction. At least one of the two chain-forming agents is a halogen compound of an element of the third to fifth main group.

22 Claims, No Drawings

METHOD FOR PRODUCING HALOGENATED OLIGOMERS AND/OR HALOGENATED POLYMERS OF ELEMENTS OF THE THIRD TO FIFTH MAIN GROUP

PRIORITY CLAIM

This is a U.S. national stage of application No. PCT/DE20091001299, filed on Sep. 15, 2009. Priority is claimed on the following applications: German Application No.: 10 2008 047 739.7 Filed on Sep. 17, 2008 and German Application No.: 10 2008 047 940.3 filed on Sep. 18, 2008, the content of which are incorporated here by reference.

The present invention relates to a method for producing halogenated oligomers and/or halogenated polymers of elements of main groups III to V.

BACKGROUND OF THE INVENTION

DE 10 2005 024 041 A1 discloses a method for producing silicon from halosilanes which comprises a first step of converting the halosilane to a halogenated polysilane by producing a plasma discharge and a subsequent, second step of decomposing the halogenated polysilane to silicon by heating.

PCT-EP 2008/002109, unpublished at the priority date of the present invention, describes a process and apparatus for plasma-supported synthesis of halogenated polysilanes or polygermanes. In this process, halosilanes or halogermanes are converted to halogenated oligo- and polysilanes or oligo- and polygermanes in a plasma-supported manner.

DE 10 2007 013 219.2, unpublished at the priority date of the present invention, relates to a process and apparatus for plasma-supported synthesis of halogenated oligo- and polymers of main groups III to V, wherein particularly the Cl- or F-halogenated elements Si, Ge, Sn and B of main groups III to V are brought to plasma-supported polymerization using $H_2$.

The prior art processes described above each utilize a single chain-former comprising a halogen compound of main groups III to V, for example a halosilane ($SiCl_4$) or a halogermane ($GeCl_4$). A plasma is produced, with hydrogen in particular, to effectuate the desired polymerization for production of, for example, halogenated polysilanes or halogenated polygermanes.

BRIEF SUMMARY OF THE INVENTION

It is an object of the present invention to provide a further method for producing halogenated oligomers and/or halogenated polymers of elements of main groups III to V. This method shall be realizable in a consistent, environmentally friendly, energy-efficient and cost-effective manner and also provide halogenated oligomers and/or halogenated polymers in high yield.

This object is achieved according to the present invention by a method for producing halogenated oligomers and/or halogenated polymers of elements of main groups III to V which comprises synthesizing the halogenated oligomers and/or halogenated polymers in a plasma-chemical manner from a first chain-former and a second chain-former, of which at least one is a halogen compound of an element of main groups III to V.

DETAILED DESCRIPTION OF THE INVENTION

Thus, in contradistinction to the prior art described above, the method of the present invention utilizes as starting substances two chain-formers, of which at least one is a halogen compound of an element of main groups III to V. Examples of such halogen compounds of elements of main groups III to V are halosilanes, such as $SiX_4$, or halogermanes, such as $GeX_4$, where X is F, Cl, Br or I. The first chain-former and the second chain-former may both consist of such a halogen compound of an element of main groups III to V. Such halogenated oligomers and/or halogenated polymers, such as halogenated polygermasilanes, are then obtained. An example of a method wherein only one chain-former consists of a halogen compound of an element of main groups III to V concerns the preparation of halogenated polycarbosilanes, for which halosilane is used as first chain-former and a hydrocarbon compound as second chain-former.

Further elements of main groups III to V suitable for the method of the present invention, in addition to silicon and germanium, are thallium, indium and gallium for example. Suitable compounds include for example nitrides or carbides of the aforementioned elements particularly of silicon. Carbon is a further chain-former, particularly in the form of hydrocarbon compounds.

Preferably, the halogenated oligomers and/or halogenated polymers of elements of main groups III to V are plasma-chemically synthesized in the presence of hydrogen. This embodiment of the method of the present invention, accordingly, includes hydrogen in the reaction as a third starting material.

In a first variant of the method according to the present invention, a plasma is produced in a gas consisting of or containing the first chain-former and the second chain-former. As mentioned above, this gas can also contain hydrogen. A corresponding gas mixture is produced and a plasma is generated therein. In the process, the conversion to halogenated oligomers and/or halogenated polymers, for example halogenated polygermasilanes or halogenated polycarbosilanes, takes place. The substances produced are then isolated in a suitable manner.

In a second variant of the method according to the present invention, the plasma is produced in a gas which subsequently has added to it a gas consisting of or containing the first chain-former and/or the second chain-former and/or hydrogen and/or a further substance. In this so-called remote method, a plasma can be produced in hydrogen for example, in which case a gas mixture of the first chain-former and the second chain-former and/or hydrogen and/or a further substance is subsequently added. In another embodiment, the plasma is produced in a gas, which consists of or contains the first chain-former or the second chain-former, and the other chain-former is subsequently added. In a further embodiment, the plasma is produced in another gas, a noble gas for example, and the gas which consists of or contains the first chain-former and the second chain-former and optionally hydrogen and a further substance is subsequently added.

In general, the gas in which the plasma is produced may additionally contain hydrogen and/or a diluting inert gas and/or admixtures favoring a plasma.

In one embodiment of the method according to the present invention, the first and second chain-formers are each formed by a halogen compound of an element of main groups III to V. This embodiment of the method according to the present invention produces halogenated polygermasilane for example, preferably chlorinated polygermasilane (PCGS).

In another embodiment of the method according to the present invention, a chain-former is formed by carbon or a hydrocarbon compound. The hydrocarbon compound may comprise aliphatic or aromatic hydrocarbon compounds, more particularly alkanes, alkenes, alkynes or aromatics or their partially or fully halogenated derivatives. This is useful for preparing halogenated polycarbosilanes for example, for example chlorinated polycarbosilanes (PCCS) from $SiCl_4$ as first chain-former and $CH_4$ as second chain-former. Such halogenated polycarbosilanes have a significant methyl group content. Owing to their composition, they are useful for the deposition of silicon carbide/layers. Halogenated polycarbosilanes are useful as single source precursor for the deposition of silicon carbide SiC, and can be thermolyzed to SiC from the liquid phase at particularly low temperature.

The halogenated oligomers and/or halogenated polymers obtained according to the present invention preferably have an atomic ratio of substituent: (first chain-former+second chain-former) of at least 1:1.

The method of the present invention more particularly provides halogenated polygermasilanes via the production and use of plasmas. Preferably, halosilane, halogermane and hydrogen are mixed with one another, and the resulting gas mixture is converted to the polygermasilane by producing a plasma.

A nonlimiting example of a halogen compound in the realm of this invention is $E_aX_bR_c$ where E=element atom; X=halogen atom; R=H and/or organic radical and/or other substituent, a=1 or greater, b=1 or greater, c=0 or greater.

The halosilane utilized in the method according to the present invention comprises more particularly compounds of the type $H_nSiX_{4-n}$ or mixtures thereof. The halogermane used in the method according to the present invention comprises more particularly compounds of the type $H_nGeX_{4-n}$ or mixtures thereof. Here X=F, Cl, Br, I and n=0-3.

The method of the present invention provides halogenated oligomers and/or halogenated polymers, more particularly halogenated polysilagermanes, which have a particularly low hydrogen content. These highly halogenated oligomers and/or halogenated polymers are characterized in that almost exclusively halogen substituents and only small amounts of hydrogen substituents are present.

The halogenated polysilagermanes obtained using the method according to the present invention are useful as single source precursor for the production of silicon-germanium alloys which are obtainable in the form of layers for example. As a result, Si—Ge layers can be deposited on substrates at comparatively low temperatures. Applications in organometallic chemistry are also conceivable, for example in the manufacture of conductive polymers, LEDs, etc.

The present invention provides in particular chlorinated oligogermasilanes and/or chlorinated polygermasilanes (PCGS) from $R_nSiCl_{4-n}$ (R=H and/or an organic radical, n=0 to 4), $R'_mGeCl_{4-m}$ (R'=H and/or organic radical, m=0 to 4, m+n=0 to 7) and/or $H_2$, and also chlorinated oligocarbosilanes and/or chlorinated polycarbosilanes (PCCS) from $R_nSiCl_{4-n}$ (R=H and/or organic radical, n=0 to 3) and $CH_4$.

In general, the method of the present invention preferably utilizes soft plasma conditions involving low energy input. Preferably, a power density of 0.2-2 $W/cm^3$ is used. Similarly, relatively low pressures are used, preferably 0.1-3 hPa.

The reaction temperatures used are preferably temperatures of less than 400° C. and more preferably of less than 300° C. (determined as reactor wall temperature for example).

Plasma production can further be additionally supported via suitable measures as described in the above-cited DE 10 2005 024 041 A1 document for example. The measures described in this document can likewise be invoked to produce and stabilize the plasma.

Cl and F are preferred halogens.

The invention further provides halogenated oligomers and/or halogenated polymers obtained by the method described above. The invention further provides for the use of halogenated oligomers and/or halogenated polymers as recited in the claims. The term "alloy" used herein shall also cover compounds and mixtures of two or more elements of main groups III to V.

The general empirical formula of the halogenated polygermasilanes obtained according to the present invention is in particular $Ge_bSi_cX_a$ where $1 \le c \le 1,000,000$; $2 \le (b+c) \le 1,000,000$; $1 \le a/(b+c) \le 3$.

The general empirical formula of the halogenated polycarbosilanes obtained according to the present invention is in particular $A_cE_bX_zR'_d$ where E=element atom; A=alkylene (e.g., —$CH_2$—), alkenylene and/or alkynylene and/or arylene; R'=H and/or alkyl and/or alkenyl and/or alkynyl and/or aryl; $1 \le (a+d)/b \le 3$; $2 \le b \le 1,000,000$; $1 \le c \le 1,000,000$. Here E and A form the backbone of the halogenated polycarbosilane, while X and R' are substituents on E.

Alkylene, alkenylene and alkynylene represent bivalent alkyl groups which in the case of alkenylene and alkynylene have one, two, three, four, five or more double bonds and triple bonds, respectively, and accordingly have at least 2 carbon atoms, for example and preferably methylene, ethylene, ethenylene, ethynylene, n-propylene, isopropylene, n-propenylene, methylethenylene and propynylene. Arylene represents a bivalent mono-, bi- or tricyclic aromatic, carbocyclic radical having in general from 6 to 14 carbon atoms, for example and preferably phenylene, naphthylene and phenanthrenylene.

Alkyl and/or alkenyl and/or alkynyl and/or aryl represent monovalent hydrocarbyl radicals which in the case of alkenyl and alkynyl have one, two, three, four, five or more double bonds and triple bonds, respectively, and accordingly have at least 2 carbon atoms, for example and preferably methyl, ethyl, ethenyl, ethynyl, n-propyl, isopropyl, n-propenyl, methylethenyl and propynyl. Arylene represents a bivalent mono-, bi- or tricyclic aromatic, carbocyclic radical having in general from 6 to 14 carbon atoms, for example and preferably phenyl, naphthyl and phenanthrenyl.

We claim:

1. A method for producing halogenated oligomers and/or halogenated polymers of elements of main groups III to V comprising synthesizing the halogenated oligomers and/or halogenated polymers in a plasma-chemical manner from a first chain-former and a second chain-former, of which at least one is a halogen compound of an element of main groups III to V.

2. The method according to claim 1, wherein the halogenated oligomers and/or halogenated polymers are plasma-chemically synthesized in the presence of hydrogen.

3. The method according to claim 1, wherein the plasma is produced in a gas consisting of or containing the first chain-former and the second chain-former.

4. The method according to claim 1, wherein the plasma is produced in a gas which subsequently has added to it a gas consisting of or containing the first chain-former and/or the second chain-former and/or hydrogen and/or a further substance.

5. The method according to claim 3, wherein the gas in which the plasma is produced additionally contains hydrogen and/or a diluting inert gas and/or plasma promoting admixtures.

6. The method according to claim 1, wherein the first and second chain-formers are each a halogen compound of an element of main groups III to V.

7. The method according to claim 1, wherein the first or second chain-former is halosilane.

8. The method according to claim 1, wherein the first or second chain-former is halogermane.

9. The method according to claim 1, wherein one of the chain-formers is a hydrocarbon compound.

10. The method according to claim 9, wherein the hydrocarbon compound is an alkane, alkene, alkyne, aromatic or a partially or fully halogenated derivative thereof.

11. The method according to claim 1, wherein the method is used for producing halogenated polygermasilanes.

12. The method according to claim 1, wherein the method is used for producing halogenated polycarbosilanes.

13. The method according to claim 1, wherein the halogenated oligomers and/or halogenated polymers have almost exclusively halogen substituents are produced.

14. The method according to claim 1, wherein chlorinated oligogermasilanes and/or chlorinated polygermasilanes (PCGS) are synthesized from $R_nSiCl_{4-n}$ (R=H and/or an organic radical, n=0 to 4), $R'_mGeCl_{4-m}$ (R'=H and/or organic radical, m=0 to 4, m+n=0 to 7) and/or $H_2$.

15. The method according to claim 1, wherein chlorinated oligocarbosilanes and/or chlorinated polycarbosilanes (PCCS) are synthesized from $R_nSiCl_{4-n}$ (R=H and/or organic radical, n=0 to 3) and $CH_4$.

16. The method according to claim 1, wherein the halogenated oligomers and/or halogenated polymers are produced at low power densities.

17. The method according to claim 1, wherein the halogenated oligomers and/or halogenated polymers are produced at a pressure of 0.1-3 hPa.

18. The method according to claim 1, wherein the halogenated oligomers and/or halogenated polymers are produced at a power density of 0.2-2 W/cm$^3$.

19. The method according to claim 1, wherein the halogenated oligomers and/or halogenated polymers are produced at temperatures below 400° C., more particularly below 300° C.

20. The method according to claim 1, wherein the first and/or second chain-former is a main group III to V element halide of the formula $E_aX_bR_c$ (E=element atom, 1≤a, X=halogen atom, 1≤b, R=H and/or organic radical and/or other substituent, 0≤c).

21. Halogenated oligomers and/or halogenated polymers, characterized in that they are obtained by the method of claim 1.

22. The method according to claim 4, wherein the gas in which the plasma is produced additionally contains hydrogen and/or a diluting inert gas and/or plasma promoting admixtures.

* * * * *